Aug. 30, 1955

R. SENESCHALL 2,716,563

GAS SEALING JOINTS

Filed Feb. 2, 1953

United States Patent Office 2,716,563
Patented Aug. 30, 1955

2,716,563

GAS SEALING JOINTS

Ronald Seneschall, Castle Donington, England, assignor to Rolls-Royce Limited, Derby, England, a company of Great Britain Application February 2, 1953, Serial No. 334,430

Claims priority, application Great Britain February 21, 1952

7 Claims. (Cl. 285—129)

This invention relates to gas-conveying ducting and has for an object to provide an improved construction of joint between two ducting parts, which joint is capable of accommodating changes in alignment of the ducting parts and which is also readily disengaged.

The joint of this invention may, for example, be employed between the exhaust structure at the outlet of a gas turbine and a jet pipe extending downstream from the exhaust structure.

According to the present invention, a joint for use in gas-conveying ducting comprises two ducting parts having at adjacent ends co-operating, annular gas-seal members adapted to permit relative angular movement of the ducting parts whilst maintaining the gas seal, and adapted to be brought into co-operation by the one being engaged within the other by a substantially axial relative movement thereof, and means for retaining the gas-seal members axially in co-operation including axially and oppositely-projecting circumferential flanges on the ducting part which carries the outer gas-seal member, a retaining piece adapted to engage said flanges in a manner to be restrained against radial disengagement therefrom, at least one of the flanges having a discontinuity to permit engagement of the retaining piece with the flanges by a circumferential movement, and said retaining piece affording an axially-facing abutment to co-operate with an axial abutment on the ducting part carrying the inner gas-seal member to limit axial separation of the gas-seal members, and locking means to prevent circumferential movement of the retaining member on the flanges.

In one preferred embodiment of the invention, the flanges are chamfered on their radially inner surfaces and the retaining piece is part-annular and has a circumferentially-directed dovetail groove on its radially inner surface to engage the chamfered flanges. The locking means in this embodiment may comprise a member adapted to be clamped radially on to the retaining piece and having radially-extending dogs to engage notches on the ducting part carrying the outer gas-seal member. To release the retaining piece for circumferential movement the dogged member is unclamped and withdrawn radially to disengage the dogs from the notches.

One embodiment of this invention will now be described by way of example as applied to a joint between the upstream end of a jet pipe and the downstream end of the outer wall of the annular exhaust structure forming the outlet of an axial-flow turbine. The description will make reference to the accompanying diagrammatic drawings, in which.

Figure 1:
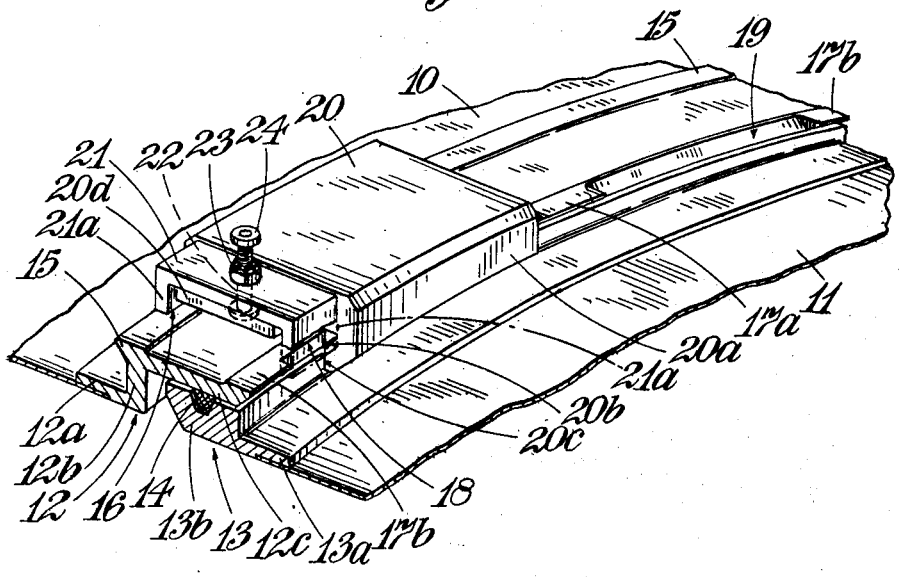
Figure 1 is a perspective view of part of the joint.

Referring to the drawings, the outer wall of the exhaust structure of the turbine is indicated at 10 and the jet pipe is indicated at 11, these two parts being formed from sheet metal.

The downstream end of the outer wall 10 of the exhaust structure carries an end ring 12 which comprises a first axial portion 12a by which it is fitted to the sheet metal wall 10, a radially-outwardly-extending web 12b and a further axially-extending portion 12c having a diameter somewhat larger than the diameter of the wall 10 and having a cylindrical inner surface. The axial portion 12c of end ring 12 affords one of a pair of gas-seal members, the second of which is carried by the upstream end of the jet-pipe 11.

The second gas-seal member is indicated at 13 and comprises a ring having an axial flange 13a by which the gas-seal member 13 is attached to the upstream end of the jet pipe 11, and a radially-thickened web portion 13b having a circcumferential groove formed in the outer surface. The groove receives a sealing ring 14 which co-operates with the inner cylindrical surface of the axial portion 12c of the ring 12 to provide the gas seal between the two ducting parts. The arrangement is such that the angular relationship of the two parts 10 and 11 can be varied without the gas sealing effect of the joint being impaired.

Instead of the web part 13b being grooved to receive a sealing ring 14, the radially-outer surface of the portion 13b may be made an equatorial zone of a sphere having a diameter equal to the internal diameter of the portion 12c of the ring 12. This arrangement also provides a satisfactory gas seal.

In both of the constructions just described the gas-seal members are brought into sealing engagement and disengaged from sealing by engagement and disengagement movements which are substantially axial with respect to the parts 10 and 11 and there is provided releasable means to prevent axial disengagement in use.

Figure 3:
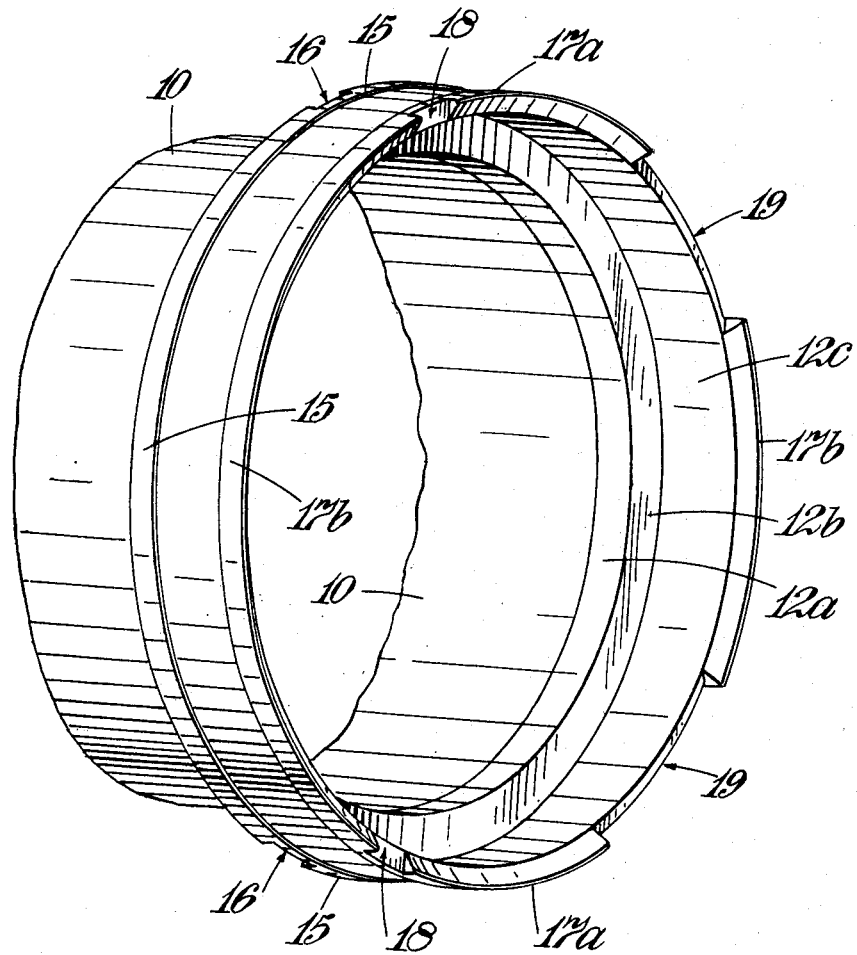
Figure 3 is a perspective view to a smaller scale than Figure 1 of the end of one of the members to be connected by the joint.

The means for preventing such axial disengagement comprises in the construction illustrated an axially-projecting flange 15 on the upstream edge of the portion 12c of the ring 12 which flange 15 is discontinuous and is formed in two parts which together extend almost the whole way around the edge of the portion 12c but which are separated at each end by short notches 16 in the edge, which notches are arranged adjacent the ends of a diameter (Figure 3) but on the same side of it so that one flange part subtends an angle somewhat greater than 180° and the other subtends an angle somewhat less than 180°. The flange 15 is chamfered on its radially inner surface.

The means comprises also an axially-projecting flange on the downstream edge of the portion 12c of the ring 12, which flange is discontinuous, has parts 17a, 17b and is chamfered on its radially inner surface. The flange includes two short flange parts 17a (Figure 3) at substantially diametrically opposite points around the portion 12c, each of which short flange parts 17a is separated from the adjacent ends of the two flange parts 17b at one end by a notch 18 which is axially aligned with a corresponding notch 16 separating the flange parts 15, and at the other end by a cut-away portion 19 the purpose of which is to enable a retaining piece 20 to be engaged with a flange part 17a and the axially-aligned end of a flange 15.

Figure 2:
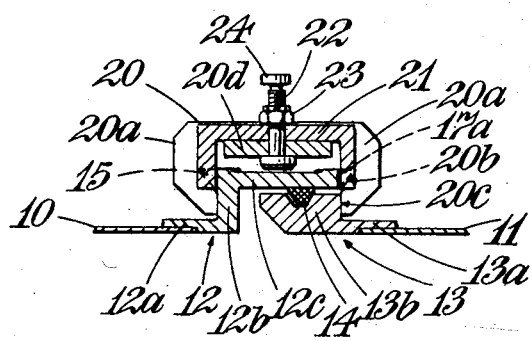
Figure 2 is an axial section through part of the joint.

Each retaining piece 20 (Figures 1 and 2) is of substantially channel section and comprises side portions 20a extending toward one another at their free ends thereby forming the walls of a dovetail groove 20b extending circumferentially along the radially inner surface of the retaining piece 20. The retaining piece 20 is engaged with a flange part 15 and the axially-aligned flange part 17a, after engagement of the gas-seal members 12, 13, by presenting the retaining piece 20 to the joint circumferentially level with the discontinuity afforded by the cut-away 19 so enabling the part of the dovetail groove 20b in one of the side portions 20a to be engaged with the flange part 15 and allowing the other side portions 20a to drop through the cut-away 19 to beyond the flange part 17a to bring the part of the dovetail groove 20b in this side portion level with the flange part 17a, and the retaining piece 20 is then displaced circumferentially with respect to the portion 12c to enter the flange part 17a into the corresponding dovetail groove 20b. With the retaining piece 20 in this position, it cannot be removed from the end ring 12 by a radial movement and in this position the retaining piece 20 straddles the web 12b and thickened flange portion 13b, and the lower portion 20c of the downstream side portion 20a provides an axially-facing abutment which is radially level with the radially thickened portion 13b of the end ring 13 and so prevents axial disengagement of the gas-seal members 12, 13.

The retaining pieces 20 are locked in position so as to prevent their circumferential displacement in use by locking means comprising for each retaining piece 20 a member 21 having at its upstream and downstream edges radially-inwardly projecting dogs 21a of such dimension as just to fit within the notches 16 and 18 so that with the dogs 21a in the notches 16 and 18 the member 21 is secured against circumferential movement. The member 21 straddles a circumferentially-directed projection 20d from one end of the corresponding retaining piece 20 and releasable clamping means is provided to lock the member 21 to the projection 20d in the position in which the dogs 21a engage with the notches 16, 18 in the ring 12. The clamping means comprises a bolt 22 which extends through the projection 20d and the member 21, the bolt being threaded over the mid-portion of its shank to receive a castellated nut 23 to tighten the two parts together and the bolt carrying at the upper end of its shank a collar 24 which prevents the complete removal of the nut from the shank when the nut is disengaged from the threaded portion of the shank.

During assembly of the retaining piece 20 to the flanges 17a, 15, the nut 23 is slackened off so that the dogs 21a can travel along the tops of the flanges until they come level with the notches 16 and 18 when they can be entered into the notches 16. The nut 23 is then tightened so clamping the locking piece 21 to the projection 20d of the retaining piece 20 and at the same time locking the retaining pieces circumferentially with respect to the flange parts 17a and 15.

The joint is such that the end ring 12 may be carried by the downstream duct portion 11 and the gas-seal member 13 by the upstream portion 10.

I claim:

1. A joint for use in gas-conveying ducting comprising two ducting parts having at adjacent ends co-operating, annular gas-seal members adapted to permit relative angular movement of the ducting parts whilst maintaining the gas seal, and adapted to be brought into co-operation by the one being engaged within the other by a substantially axial relative movement thereof, the inner gas seal member having an abutment formed by an axially-facing surface directed away from the outer gas seal member and means for retaining the gas-seal members axially in co-operation including axially and oppositely-projecting circumferential flanges on the outer gas-seal member, a retaining piece adapted to engage said flanges in a manner to be restrained against radial disengagement therefrom, at least one of the flanges having a discontinuity to permit radial movement of the retaining piece to a position in which the retaining piece embraces the said gas seal members and from which the retaining piece is movable circumferentially into engagement with the flanges, and said retaining piece having an axially-facing abutment to co-operate with said abutment of the inner gas seal member to limit axial separation of the gas-seal members, and locking means to prevent circumferential movement of the retaining member on the flanges.

2. A joint as claimed in claim 1, having said flanges formed with chamfered radially-inner surfaces, and having the retaining piece made part annular and comprising a circumferentially-directed dovetail groove on its radially inner surface to engage the chamfered flanges.

3. A joint as claimed in claim 1, wherein the locking means comprises a member adapted to be clamped radially on to the retaining piece and having radially-extending dogs to engage notches on the ducting part carrying the outer gas seal member.

4. A joint as claimed in claim 3, having a circumferentially-directed projection from one end of the retaining piece, said member with the radially-extending dogs being adapted to straddle the projection.

5. A joint as claimed in claim 4, comprising a bolt threaded over a portion of its length, and extending through the projection and the member straddling it, a clamping nut engaged on said bolt, and a collar at the upper end of said bolt to prevent complete disengagement of the nut from the shank.

6. A joint as claimed in claim 1, comprising a plurality of such retaining pieces disposed in circumferentially spaced relation around and locked to the outer gas seal member.

7. A joint for use in gas-conveying ducting comprising a first duct part having at its end a first annular member affording an internal surface, a second duct part having at its end a second annular member affording an external surface, said internal and external surfaces being adapted to co-operate to prevent leakage of gas therebetween, a pair of radially-directed webs one on each of said members to afford radially-extending, oppositely- and axially-facing surfaces, a pair of oppositely-directed axially-projecting circumferentially-extending flanges on one of said webs, one at least of said flanges being circumferentially discontinuous to afford a cut-away portion, a circumferentially-extending retaining piece of substantially channel section to straddle said webs and abut said oppositely- and axially-facing surfaces thereby to prevent axial separation of said duct parts, said retaining piece having side portions extending toward one another at their free ends and adapted to engage with said circumferentially-extending flanges, the circumferential extent of said retaining piece being less than the extent of said cut-away portion whereby the retaining piece may be engaged with said flanges by circumferential movement, and releasable clamping means to secure said retaining piece against circumferential movement.

References Cited in the file of this patent

UNITED STATES PATENTS

| | | |
|---|---|---|
| 2,360,345 | Hilkemeier | Oct. 17, 1944 |
| 2,466,602 | Lombard et al. | Apr. 5, 1949 |